(12) United States Patent
Ohashi et al.

(10) Patent No.: US 8,803,832 B2
(45) Date of Patent: Aug. 12, 2014

(54) CONTACT OPERATION DETERMINATION APPARATUS, CONTACT OPERATION DETERMINATION METHOD, AND PROGRAM

(75) Inventors: Yoshinori Ohashi, Tokyo (JP); Tsuyoshi Oobayashi, Tokyo (JP)

(73) Assignee: Sony Corporation (JP)

( * ) Notice: Subject to any disclaimer, the term of this patent is extended or adjusted under 35 U.S.C. 154(b) by 266 days.

(21) Appl. No.: 13/509,875

(22) PCT Filed: Oct. 28, 2010

(86) PCT No.: PCT/JP2010/069206
§ 371 (c)(1),
(2), (4) Date: May 15, 2012

(87) PCT Pub. No.: WO2011/068001
PCT Pub. Date: Jun. 9, 2011

(65) Prior Publication Data
US 2012/0229409 A1    Sep. 13, 2012

(30) Foreign Application Priority Data
Dec. 2, 2009    (JP) .................................. 2009-274911

(51) Int. Cl.
*G06F 3/041*    (2006.01)
(52) U.S. Cl.
USPC .......................................... 345/173; 455/566
(58) Field of Classification Search
CPC   G06F 3/0416; G06F 3/04886; G06F 3/04883
USPC .................... 345/173–184; 455/566
See application file for complete search history.

(56) References Cited

U.S. PATENT DOCUMENTS

| | | | |
|---|---|---|---|
| 2007/0075985 A1* | 4/2007 | Niida | 345/173 |
| 2007/0263015 A1* | 11/2007 | Ketola et al. | 345/684 |
| 2008/0126073 A1* | 5/2008 | Longe et al. | 704/1 |
| 2008/0204423 A1* | 8/2008 | Kim | 345/173 |
| 2009/0046075 A1* | 2/2009 | Kim et al. | 345/173 |

(Continued)

FOREIGN PATENT DOCUMENTS

| | | |
|---|---|---|
| JP | 2007-316760 A | 12/2007 |
| JP | 3143462 U | 7/2008 |
| WO | 2009/119716 A1 | 10/2009 |

*Primary Examiner* — Amare Mengistu
*Assistant Examiner* — Vinh Lam
(74) *Attorney, Agent, or Firm* — Lerner, David, Littenberg, Krumholz & Mentlik, LLP (57) ABSTRACT

[Object] To provide a contact operation determination apparatus, a contact operation determination method, and a program that are capable of avoiding erroneous determination in an end portion of a contact detection area.

[Solution] A contact operation determination apparatus includes a display panel 101b, a touch panel 101a configured to detect a contact operation for a contact detection area 110 provided on the display panel surface 101b, an area setting unit configured to set, in the contact detection area, a first area 111, and a second area 112 that surrounds the first area second area 112 so as to have a width greater than or equal to a predetermined distance D from a contact starting point SP to contact end points EP and EP', the first area second area 112 being used to discriminate between a tap operation and a flick operation, and an operation determination unit configured to determine, when a contact end point is detected in the first or second area after a contact starting point has been detected in the second area, that a flick operation has been performed.

6 Claims, 7 Drawing Sheets

(56) References Cited

U.S. PATENT DOCUMENTS

| | | | |
|---|---|---|---|
| 2009/0264157 A1* | 10/2009 | Hsieh et al. | 455/566 |
| 2010/0105443 A1* | 4/2010 | Vaisanen | 455/566 |
| 2010/0107067 A1* | 4/2010 | Vaisanen | 715/702 |
| 2010/0131880 A1* | 5/2010 | Lee et al. | 715/769 |
| 2010/0245261 A1* | 9/2010 | Karlsson | 345/173 |
| 2011/0141027 A1* | 6/2011 | Ghassabian | 345/168 |
| 2011/0163988 A1* | 7/2011 | Senda | 345/173 |

* cited by examiner

CONTACT OPERATION DETERMINATION APPARATUS, CONTACT OPERATION DETERMINATION METHOD, AND PROGRAM

CROSS-REFERENCE TO RELATED APPLICATION

The present application is a national phase entry under 35 U.S.C. §371 of International Application No. PCT/JP2010/069206 filed Oct. 28, 2010, published on Jun. 9, 2011 as WO 2011/068001 A1, which claims priority from Japanese Patent Application No. JP 2009-274911 filed in the Japanese Patent Office on Dec. 2, 2009.

TECHNICAL FIELD

The present invention relates to a contact operation determination apparatus, a contact operation determination method, and a program.

BACKGROUND ART

In recent years, electronic apparatuses having a touch panel, such as a commander, a PDA, a mobile phone, and a music player, have become popular. In these electronic apparatuses, there is a case in which a user specifies an arbitrary contact starting point in a contact detection area of a touch panel and performs a tap operation or a flick operation, thereby causing a user's instruction to be input. In this case, it is possible for the user to input a desired instruction without having to confirm by looking at the display on the touch panel. Here, a "tap operation" is an operation in which after touching the touch panel using a finger or the like, the finger or the like is moved away from the touch panel, and a "flick operation" is an operation in which the touch panel is flicked with a finger or the like.

SUMMARY OF INVENTION

Technical Problem

However, as described in the following, when a contact starting point is specified in an end portion of a contact detection area and a flick operation is performed, there is a case in which an erroneous determination is made that a tap operation has been performed, and a desired instruction is not performed.

Here, which of a tap operation and a flick operation has been determined is determined in the following manner. When a contact end point (non-contact point) is detected within a predetermined distance from the contact starting point after a contact starting point has been detected, it is determined that a tap operation has been performed. Furthermore, when a contact end point (non-contact point) is detected outside the area of a predetermined distance from the contact starting point after a contact starting point has been detected, it is determined that a flick operation has been performed.

However, in a case where a contact operation is started in an end portion of a contact detection area and the contact operation is completed in an area other than the contact detection area, there is a case in which an erroneous determination is made that a tap operation has been performed. Here, when an area other than the contact detection area exists within the predetermined distance from the contact starting point, erroneous determination occurs.

In this case, since a contact operation cannot be detected (or is not detected) in areas other than the contact detection area, the contact operation is regarded as having been completed at a boundary (outer edge of the contact detection area) between the contact detection area and the area other than the contact detection area, and the contact operation is detected as being performed at a contact end point. Therefore, there is a case in which although the user has performed a flick operation, erroneous determination is made that a tap operation has been performed.

Accordingly, the present invention aims to provide a contact operation determination apparatus, a contact operation determination method, and a program that are capable of avoiding erroneous determination in an end portion of a contact detection area.

Solution to Problem

According to a first aspect of the present invention, there is provided a contact operation determination apparatus including a display panel; and an operation detection unit configured to detect a contact operation for a contact detection area provided on a surface of the display panel; an area setting unit configured to set, in the contact detection area, a first area, and a second area that surrounds the first area so as to have a width greater than or equal to a predetermined distance from a contact starting point to a contact end point, the second area being used to discriminate between a tap operation and a flick operation; and an operation determination unit configured to determine, when the contact end point is detected in the first or second area after the contact starting point has been detected in the second area, that the flick operation has been performed.

According to such a configuration, the first and second areas are set in the contact detection area. Here, the second area is set in such a manner as to surround the first area and so as to have a width greater than or equal to a predetermined distance from the contact starting point to the contact end point, which is used to discriminate between a tap operation and a flick operation. Then, when the contact end point is detected in the first or the second area after the contact starting point has been detected in the second area, it is determined that a flick operation has been performed. As a result, even when the contact starting point is specified in the second area and a flick operation is performed, it is possible to avoid erroneous determination that a tap operation has been performed.

The contact operation determination apparatus may further include a remote operation unit for remotely operating electronic apparatuses in response to the execution of the tap operation and/or the flick operation.

When the contact end point is detected within an area of a predetermined distance from the contact starting point after the contact starting point has been detected in the first area, the operation determination unit may determine that a tap operation has been performed.

When the contact end point is detected in an area outside the area of the predetermined distance from the contact starting point after the contact starting point has been detected in the first area, the operation determination unit may determine that a flick operation has been performed.

When the contact end point is not detected and the contact point is detected in an area outside the area of a predetermined distance from the contact starting point after the contact starting point has been detected in the first area, the operation determination unit may determine that a flick operation has been performed.

According to a second aspect of the present invention, there is provided a contact operation determination method including setting a first area in a contact detection area; setting, in the contact detection area, a second area that surrounds the first area, the second area having a width greater than or equal to a predetermined distance from a contact starting point to a contact end point and being used to discriminate between a tap operation and a flick operation; and determining, when the contact end point is detected in the first or second area after the contact starting point has been detected in the second area, that a flick operation has been performed.

According to a third aspect of the present invention, there is provided a program for causing a computer to perform the contact operation determination method. Here, the program may be provided by using a computer-readable recording medium or may be provided through communication means.

Advantageous Effects of Invention

As has been described above, according to the present invention, it is possible to provide a contact operation determination apparatus, a contact operation determination method, and a program that are capable of avoiding erroneous determination regarding a contact operation in an end portion of a contact detection area.

DESCRIPTION OF EMBODIMENTS

Preferred embodiments of the present invention will be described below in detail with reference to the attached drawings. Meanwhile, in this specification and the drawings, components having substantially the same functional configuration are designated with the same reference numerals, and duplicate descriptions thereof are omitted.

[1. Overview of Contact Operation Determination Apparatus]

First, with reference to FIG. 1, an overview of a contact operation determination apparatus according to an embodiment of the present invention will be described. Meanwhile, in the following, a description will be given of a case in which the contact operation determination apparatus is a commander 100 having a touch panel display 101. However, the contact operation determination apparatus may be another electronic apparatus having the touch panel display 101.

Figure 1:
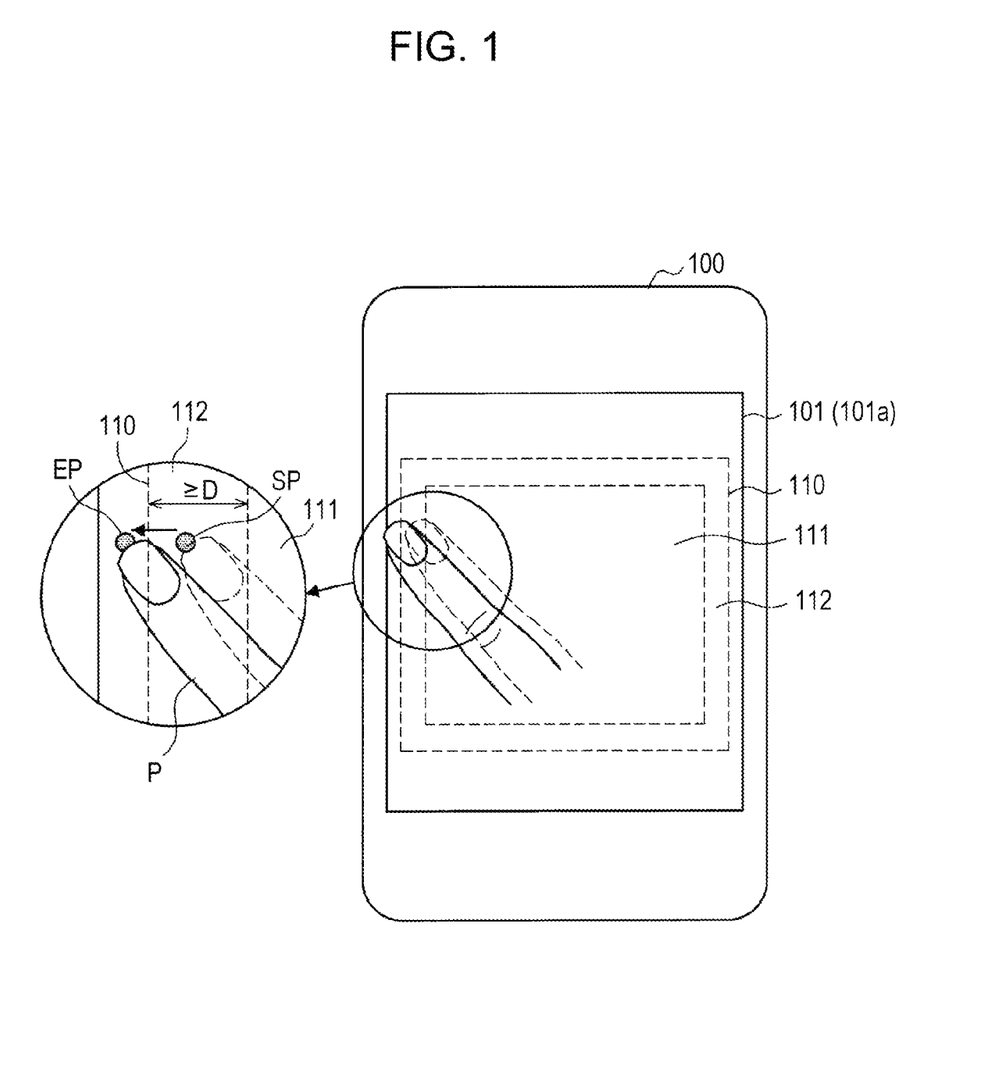
FIG. 1 illustrates an overview of a contact operation determination apparatus according to an embodiment of the present invention.

As shown in FIG. 1, the commander 100 determines whether a contact operation has been performed by a user in the contact detection area 110 of a touch panel 101a provided on the touch panel display 101. Meanwhile, the contact detection area 110 may be the entire area on the touch panel 101a or a predetermined area on the touch panel 101a that is set using the commander 100.

Here, the commander 100 determines which type of a contact operation out of a tap operation and a flick operation has been performed with an arbitrary contact starting point SP being specified in the contact detection area 110. As a result of determining such a contact operation, it is possible for the user to input a desired instruction without having to confirm by looking at display on the touch panel 101a (a display panel 101b shown in FIG. 3).

The commander 100 sets first and second areas 111 and 112 in the contact detection area 110. Here, the commander 100 sets the second area 112 in such a manner as to surround the first area 111 and so as to have a width greater than or equal to a predetermined distance D from the contact starting point SP to a contact end point EP (or contact end point EP'), which is used to discriminate between a tap operation and a flick operation. Meanwhile, the outer edge of the second area 112 corresponds to the outer edge of the contact detection area 110.

When a user's finger P, a stylus, or the like contacts the contact detection area 110 and thereafter moves away from (or strays from) the contact detection area 110, the commander 100 determines which one of a tap operation and a flick operation has been performed. Then, the commander 100 performs a process corresponding to the determination result of the contact operation.

Here, when the contact starting point SP is detected in the second area 112, the commander 100 determines that a flick operation has been performed regardless of the position of the contact end point EP. As a result, even when the contact starting point SP is specified in the second area 112 and a flick operation has been performed, it is possible to avoid erroneous determination that a tap operation has been performed.

[2. Configuration of Commander 100]

Next, a description will be given of the configuration of the commander 100 with reference to FIGS. 2 and 3.

Figure 2:
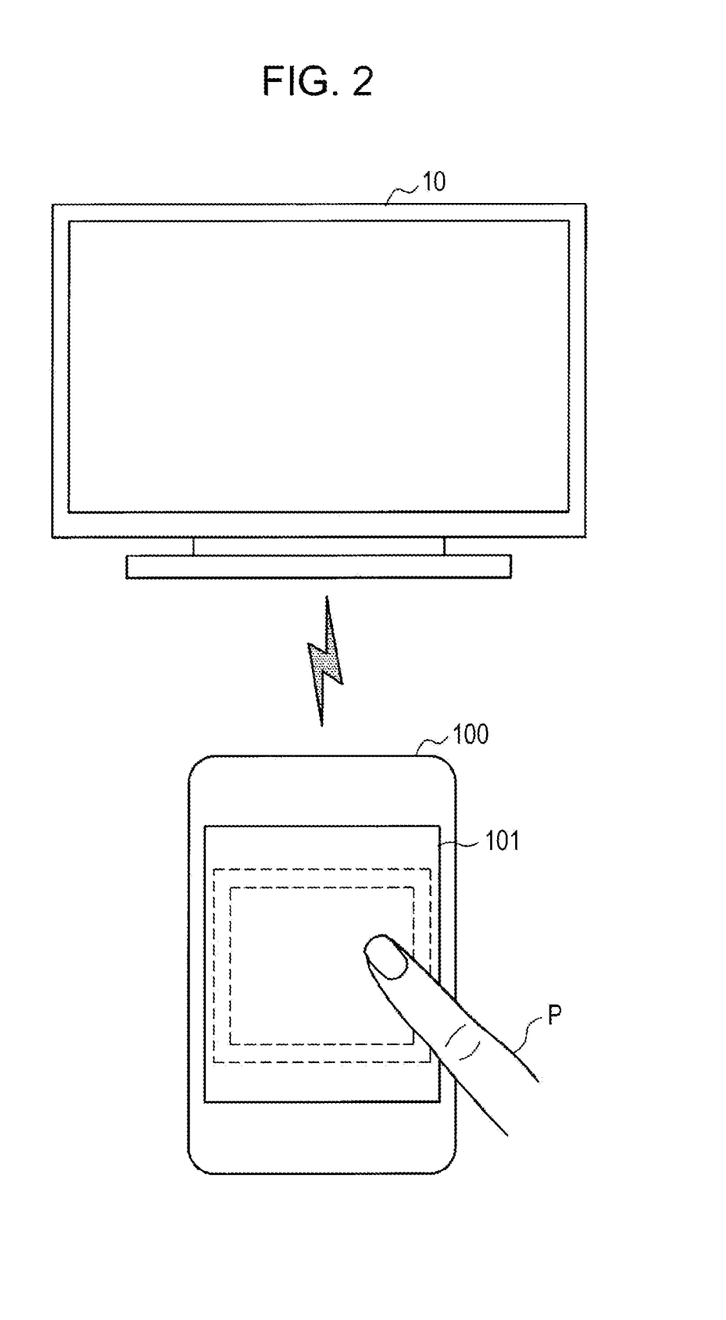
FIG. 2 illustrates the configuration of a remote operation system including a commander.

As shown in FIG. 2, the commander 100 constitutes part of a remote operation system for remotely operating electronic apparatuses, such as a television receiver 10. The commander 100 is an example of an electronic apparatus, such as a PDA, a mobile phone, or a music player. The television receiver 10 is an example of an electronic apparatus that is remotely operated by a user using the commander 100.

The commander 100 performs two-way communication with the television receiver 10 without using a network or via a wired or wireless network. In response to a contact operation of the user on the touch panel 101a, the commander 100 transmits an operation command to the television receiver 10, and receives data, such as content information, from the television receiver 10. Meanwhile, the commander 100 may be configured to have only the transmission function for an operation command in place of the two-way communication function.

Here, the commander 100 determines which of a tap operation and a flick operation has been performed, which is performed with an arbitrary contact starting point SP being specified in the contact detection area 110 of the touch panel 101a, which is provided on the touch panel display 101. As a result, the user can input a desired instruction without having to confirm by looking at the display on the display panel 101b in a state in which the user is paying attention to content being viewed on the television receiver 10.

Figure 3:
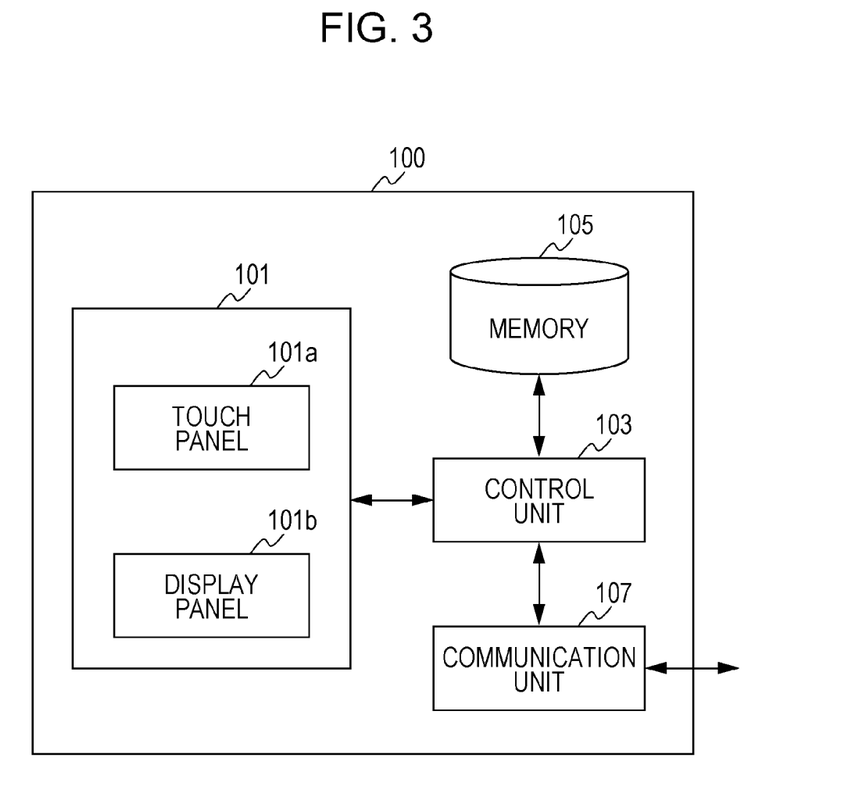
FIG. 3 is a block diagram illustrating the main configuration of the commander.

As shown in FIG. 3, the commander 100 includes the touch panel display 101, a control unit 103, a memory 105, and a communication unit 107.

The touch panel display 101 is configured in such a manner that the display panel 101b is layered on the touch panel 101a. For the touch panel 101a, a panel of a resistance film method, an electrostatic capacitance method, an ultrasonic wave method, or an infrared method is used. For the display panel 101b, a liquid-crystal display (LCD) or the like is used.

The touch panel 101a functions as an operation detection unit by detecting the contact state of the finger P, a stylus, or the like on the panel surface. The touch panel 101a supplies a contact signal to the control unit 103 when the finger P touches the panel surface, and supplies a release signal to the control unit 103 when the finger P is moved away from the panel surface.

Furthermore, while the finger P is in contact with the touch panel 101a, the touch panel 101a supplies a coordinate signal corresponding to the contact position to the control unit 103. Here, the coordinate signal represents the X-Y coordinates of the contact position for the touch panel 101a.

The control unit 103 includes a CPU, a RAM, a ROM, and the like. The CPU executes a program stored in the ROM by using the RAM as a work memory, and controls the units of the commander 100. The control unit 103 functions as an area setting unit and an operation determination unit through the execution of the program.

The memory 105 is a non-volatile memory, such as an EEPROM, and has stored therein display data, command information, and the like. The communication unit 107 transmits a predetermined operation command to the television receiver 10 in response to an operation input by the user. Furthermore, the communication unit 107 transmits a transmission request, such as content information, to the television receiver 10, and receives content information and the like from the television receiver 10.

The control unit 103 decodes the coordinate signal supplied from the touch panel 101a so as to generate coordinate data, and controls the units of the commander 100 on the basis of the coordinate data and the contact/release signal.

In response to the operation input by the user, the control unit 103 reads command information corresponding to the operation input from the memory 105, and supplies the command information to the communication unit 107. The communication unit 107 transmits a predetermined operation command to the television receiver 10 on the basis of the command information.

The control unit 103 reads the data stored in the memory 105 so as to generate the display data of a GUI screen, and supplies the display data to the display panel 101b. The display panel 101b displays a GUI screen on the basis of the display data.

The control unit 103 sets the contact detection area 110 on the touch panel 101a, and sets the first and second areas 111 and 112 in the contact detection area 110. The control unit 103 sets the first and second areas 111 and 112 by using the coordinates on the touch panel 101a, and holds the first and second areas 111 and 112. Here, the second area 112 is set in such a manner as to surround the first area 111 and so as to have a width greater than or equal to a predetermined distance D from the contact starting point SP to the contact end point EP (or the contact end point EP'), which is used to discriminate between a tap operation and a flick operation.

Furthermore, when the contact end points EP and EP' are detected in the first and second areas 111 and 112 after the contact starting point SP has been detected in the second area 112, the control unit 103 determines that a flick operation has been performed. Here, the control unit 103 compares the coordinates of the contact starting point SP or the contact end points EP and EP' with the coordinates of the first area 111 or the second area 112, and thus determines the positional relationship between the contact starting point SP or the contact end points EP and EP', and the first area 111 or the second area 112.

[3. Erroneous Determination Regarding Contact Operation]

Next, a description will be given, with reference to FIGS. 4 and 5, of erroneous determination regarding a contact operation in the end portion of the contact detection area 110.

Figure 4:
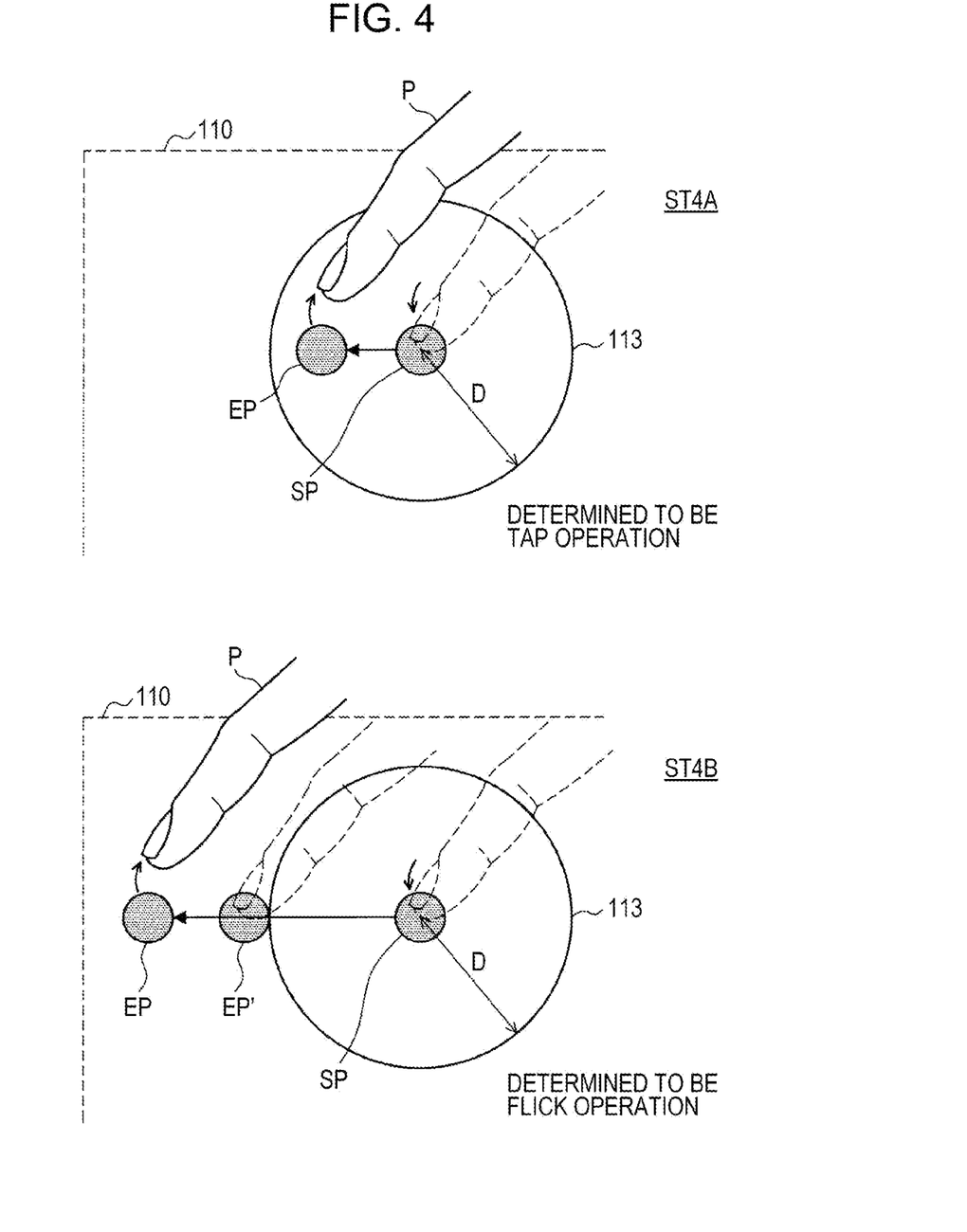
FIG. 4 illustrates a method of discriminating between a tap operation and a flick operation.

As shown in FIG. 4, the commander 100 discriminate between a tap operation and a flick operation.

As shown in states ST4A and ST4B, when the user's finger P touches the contact detection area 110 of the touch panel 101a, the commander 100 detects the contact position of the finger P as the contact starting point SP. The commander 100 sets the area of the range at a distance D from the contact starting point SP as a tap determination area 113. Next, when the finger P is moved away from the touch panel 101a, the commander 100 detects the contact end position of the finger P as the contact end point EP. Then, the commander 100 determines whether the contact end point EP is positioned within the tap determination area 113.

Here, in the state ST4A, since the contact end point EP is positioned within the tap determination area 113, the commander 100 determines that a tap operation has been performed. On the other hand, in the state ST4B, since the contact end point EP is positioned outside the tap determination area 113, the commander 100 determines that a flick operation has been performed. Meanwhile, in the state ST4B, when the contact point EP' is detected outside the tap determination area 113 before the contact end point EP has been detected, the commander 100 may determine that a flick operation has been performed.

By the way, in the end portion of the contact detection area 110, there is a case in which a contact operation is erroneously determined.

When the user's finger P touches the touch panel 101a in the end portion of the contact detection area 110, the commander 100 detects the contact starting point SP, and sets the area in the range of a distance D from the contact starting point SP as the tap determination area 113. Here, when the contact starting point SP is positioned at a distance smaller than the distance D from the boundary (the outer edge of the contact detection area 110) between the contact detection area 110 and outside the area, a portion (in the example shown in FIG. 5, the left side of the tap determination area 113) of the tap determination area 113 is strayed from the contact detection area 110.

In order to perform a flick operation, the user performs an operation of releasing the finger P from the touch panel 101a after the finger P has been moved from the contact detection area 110 to outside the area. However, the commander 100 cannot detect (or does not detect) the contact position of the finger P outside the area. For this reason, when the finger P is moved to the outer edge of the contact detection area 110, the commander 100 considers that the finger P has moved away from the touch panel 101a, and detects the outer edge of the contact detection area 110 as a contact end point EP'. Then, the commander 100 determines whether the contact end point EP' is positioned within the tap determination area 113.

Figure 5:
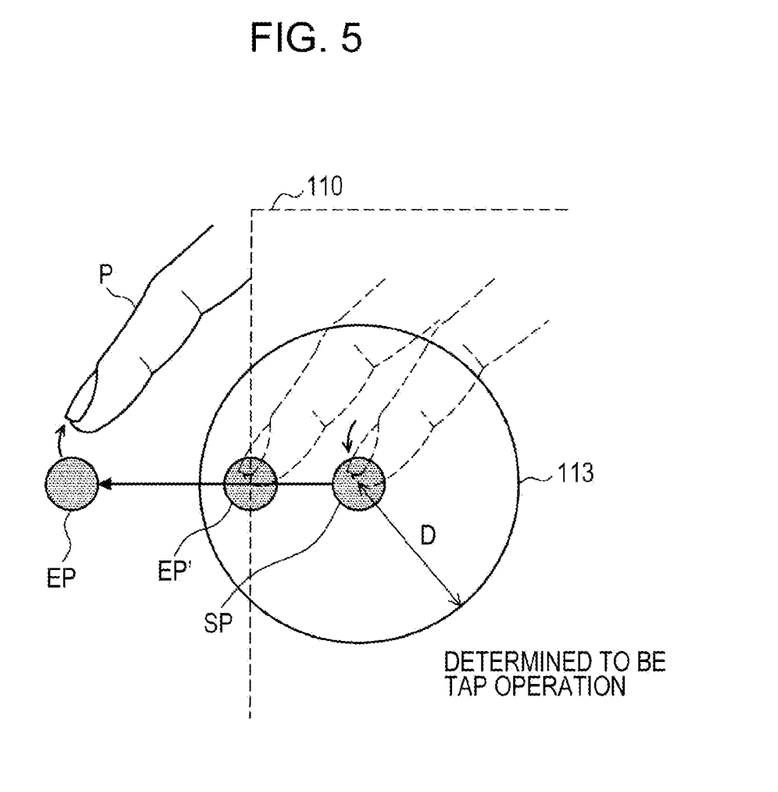
FIG. 5 illustrates a state in which a contact operation in the end portion of a contact detection area is erroneously determined.

Here, in the example shown in FIG. 5, since the contact end point EP' is positioned within the tap determination area 113 (the outer edge of the contact detection area 110), the commander 100 determines that a tap operation has been performed. Therefore, in spite of the fact that the user has performed a flick operation, erroneous determination is made that a tap operation has been performed.

[4. Operation of Commander 100]

Next, the operation of the commander 100 will be described with reference to FIGS. 6 and 7.

Figure 6:
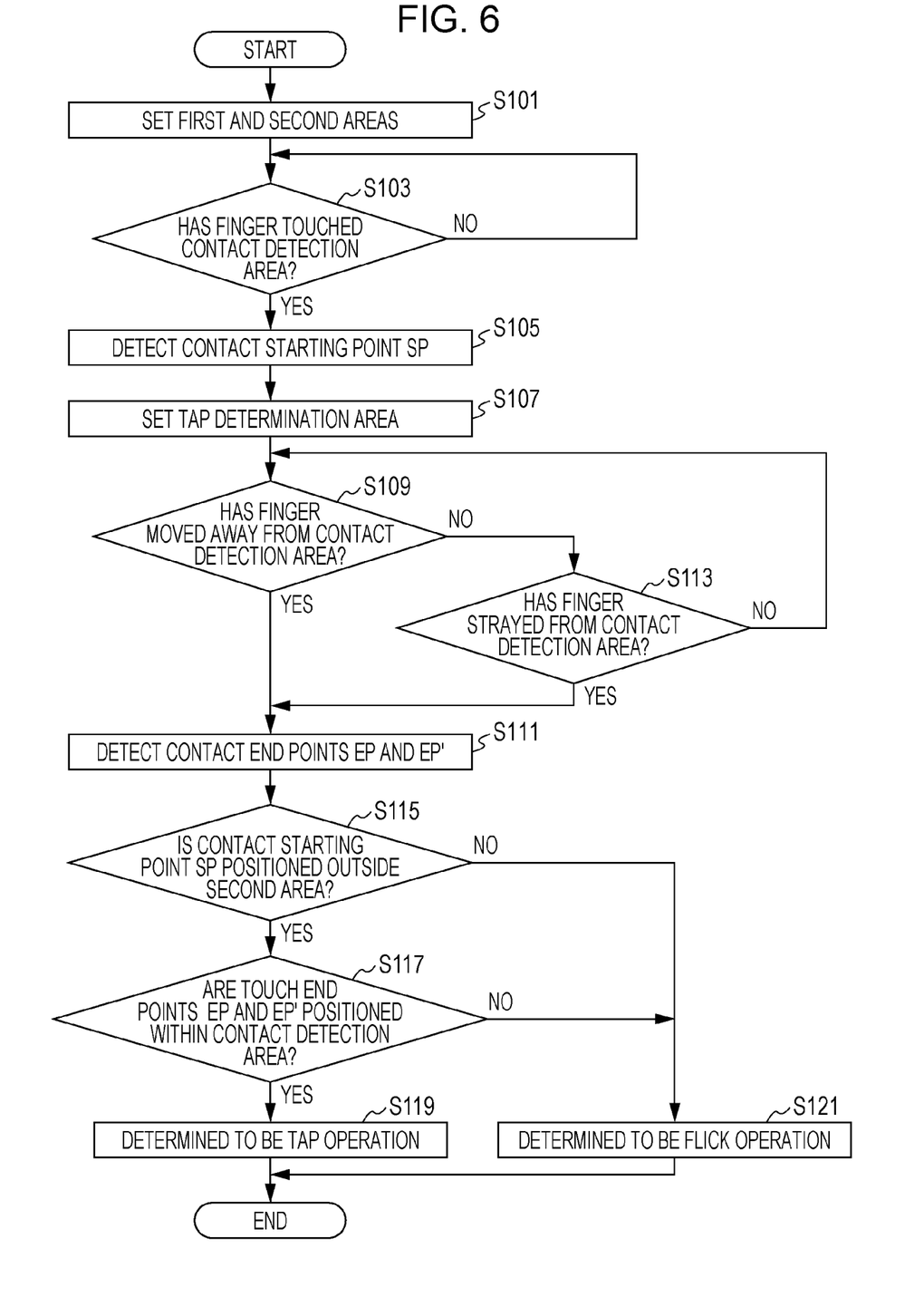
FIG. 6 is a flowchart illustrating the operation of the commander.

The commander 100 operates in accordance with a contact operation determination method shown in FIG. 6. As shown in FIG. 6, the commander 100 sets the first and second areas 111 and 112 in the contact detection area 110 (step S101). The second area 112 is set as a band-shaped area having a width greater than or equal to D in such a manner as to surround the first area 111. Meanwhile, the outer edge of the second area 112 corresponds to the outer edge of the contact detection area 110.

The commander 100 determines whether the user's finger P touches the contact detection area 110 (S103). Then, when the finger P touches the contact detection area 110, the contact start position of the finger P is detected as the contact starting point SP (S105), and the area in a range of the distance D from the contact starting point SP is set as the tap determination area 113 (S107).

Next, the commander 100 determines whether the finger P has moved away from the contact detection area 110 (S109). When the finger P has moved away from the contact detection area 110, the commander 100 detects the contact end position of the finger P as the contact end point EP (S111). Furthermore, the commander 100 determines whether the finger P has strayed from the contact detection area 110 (S113). When the finger P has strayed from the contact detection area 110, the commander 100 considers that the finger P has moved away from the contact detection area 110, and detects the position the finger P was touching the contact detection area 110 in the outer edge of the contact detection area 110 as the contact end point EP' (S111).

When the contact end points EP and EP' are detected, the commander 100 determines whether the contact starting point SP is positioned outside the second area 112 (S115).

When it is determined that the contact starting point SP is positioned outside the second area 112, the commander 100 determines whether the contact end points EP and EP' are positioned within the tap determination area 113 (S117). Then, when the contact end points EP and EP' are positioned within the tap determination area 113, the commander 100 determines that a tap operation has been performed (S119), and when the contact end points EP and EP' are positioned outside the tap determination area 113, the commander 100 determines that a flick operation has been performed (S121).

On the other hand, when it is determined in the process of step 5115 that the contact starting point SP is not positioned outside the second area 112 (that is, positioned within the second area 112), the commander 100 determines that a flick operation has been performed regardless of the positions of the contact end points EP and EP' (S121).

Figure 7:
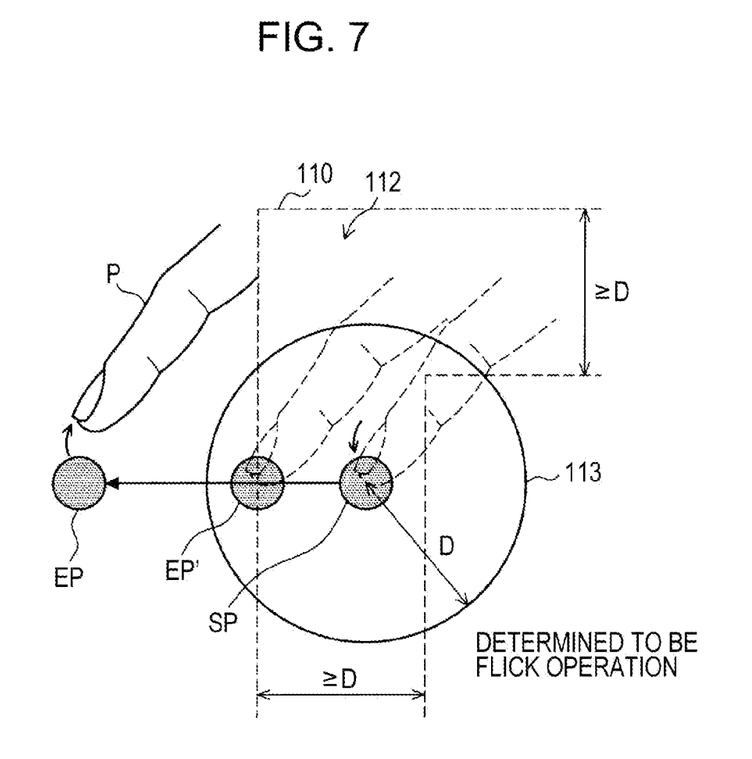
FIG. 7 illustrates a state in which erroneous determination regarding a contact operation in the end portion of the contact detection area is avoided.

As shown in FIG. 7, the commander 100 avoids erroneous determination regarding the contact operation in the end portion of the contact detection area 110 in accordance with a contact operation determination method shown in FIG. 6. The commander 100 sets the first and second areas 111 and 112 in the contact detection area 110. The outer edge of the second area 112 corresponds to the outer edge of the contact detection area 110.

The second area 112 is set as a band-shaped area having a width of D or more in such a manner as to surround the first area 111. Here, the width of the second area 112 corresponds to a distance of the predetermined distance D or more from the contact starting point SP to the contact end points EP and EP', which is used to determine which of a tap operation and a flick operation has been performed.

When the user's finger P touches the touch panel 101a in the second area 112, the commander 100 detects the contact starting point SP, and sets the area in the range of the distance D from the contact starting point SP as the tap determination area 113. Here, a case is assumed in which the contact starting point SP is positioned in a range smaller than the distance D from the outer edge of the second area 112. In this case, as shown in FIG. 7, a portion of the tap determination area 113 is strayed from the contact detection area 110.

After the user's finger P moves from the second area 112 to outside the area (outside the area of the contact detection area 110), the user's finger P moves away from the touch panel 101a. However, the commander 100 cannot (or does not detect) the contact position of the finger P outside the area. For this reason, the commander 100 considers that the finger P has moved away from the touch panel 101a when the finger P moves to the outer edge of the second area 112, and detects the outer edge of the second area 112 as the contact end point EP'. Then, the commander 100 determines whether the contact end point EP' is positioned within the tap determination area 113.

Here, in the example shown in FIG. 7, since the contact end point EP' is positioned within the tap determination area 113, in the contact operation determination method of the related art, the commander 100 determines that a tap operation has been performed. However, the commander 100 determines whether the contact starting point SP is positioned within the second area 112 before determining whether the contact end point EP' has been positioned within the tap determination area 113. Then, in the example shown in FIG. 7, since the contact starting point SP is positioned within the second area 112, the commander 100 determines that a flick operation has been performed regardless of the position of the contact end point EP'. Therefore, it is possible to avoid erroneous determination that a tap operation has been performed.

[5. Conclusion]

As has been described above, in the commander 100 according to the embodiment of the present invention, the first and second areas 111 and 112 are set in the contact detection area 110. Here, the second area 112 is set in such a manner as to surround the first area 111 and so as to have a width greater than or equal to the predetermined distance D from the contact starting point SP to the contact end points EP and EP', which is used to discriminate between a tap operation and a flick operation. Then, when the contact end points EP and EP' are detected in the first or second area 111 or 112 after the contact starting point SP has been detected in the second area 112, it is determined that a flick operation has been performed. As a result, even when the contact starting point SP is specified in the second area 112 and a flick operation is performed, it is possible to avoid erroneous determination that a tap operation has been performed.

Although preferred embodiments of the present invention have been described in detail with reference to the attached drawings, the present invention is not limited to such examples. It is obvious that a person having ordinary knowledge in the technical field to which the present invention belongs can conceive various changes or modifications within the scope of the technical concept described in the claims, and it should be understood that the various changes or modifications naturally fall within the technical scope of the present invention.

REFERENCES SIGNS LIST 100 commander
101 touch panel display 101a touch panel
101b display panel
110 contact detection area
111 first area
112 second area
113 flick determination area
SP contact starting point
EP, EP' contact end point

The invention claimed is:

1. A contact operation determination apparatus comprising:
   a display panel; and
   an operation detection unit configured to detect a contact operation for a contact detection area provided on a surface of the display panel;
   an area setting unit configured to set, in the contact detection area, a first area, and a second area that surrounds the first area so as to have a width greater than or equal to a predetermined distance from a contact starting point to a contact end point, the second area being used to discriminate between a tap operation and a flick operation; and
   an operation determination unit configured to determine, when the contact end point is detected in the first or second area after the contact starting point has been detected in the second area, that the flick operation has been performed,
   wherein when the contact end point is detected within an area of the predetermined distance from the contact starting point after the contact starting point has been detected in the first area, the operation determination unit determines that the tap operation has been performed.

2. The contact operation determination apparatus according to claim 1, further comprising a remote operation unit configured to remotely operate an electronic apparatus in response to the execution of the tap operation and/or the flick operation.

3. The contact operation determination apparatus according to claim 1, wherein when the contact end point is detected outside an area of the predetermined distance from the contact starting point after the contact starting point has been detected in the first area, the operation determination unit determines that the flick operation has been performed.

4. The contact operation determination apparatus according to claim 1, wherein when the contact end point is not detected and a contact point is detected outside an area of the predetermined distance from the contact starting point after the contact starting point has been detected in the first area, the operation determination unit determines that the flick operation has been performed.

5. A contact operation determination method comprising:
   setting a first area in a contact detection area;
   setting, in the contact detection area, a first area, and a second area that surrounds the first area so as to have a width greater than or equal to a predetermined distance from a contact starting point to a contact end point, the second area being used to discriminate between a tap operation and a flick operation;
   determining, when the contact end point is detected in the first or second area after the contact starting point has been detected in the second area, that the flick operation has been performed; and
   determining, when the contact end point is detected within an area of the predetermined distance from the contact starting point after the contact end point has been detected in the first area, that the tap operation has been performed.

6. A program for causing a computer to perform a contact operation determination method comprising:
   setting a first area in a contact detection area;
   setting, in the contact detection area, a first area, and a second area that surrounds the first area so as to have a width greater than or equal to a predetermined distance from a contact starting point to a contact end point, the second area being used to discriminate between a tap operation and a flick operation;
   determining, when the contact end point is detected in the first or second area after the contact starting point has been detected in the second area, that the flick operation has been performed; and
   determining, when the contact end point is detected within an area of the predetermined distance from the contact starting point after the contact end point has been detected in the first area, that the tap operation has been performed.

* * * * *